US012198744B2

(12) United States Patent
Kunze et al.

(10) Patent No.: US 12,198,744 B2
(45) Date of Patent: Jan. 14, 2025

(54) HYBRID DIGITAL AND ANALOG DATA STORAGE

(71) Applicant: Ceramic Data Solutions GmbH, Gmunden (AT)

(72) Inventors: Martin Kunze, Gmunden (AT); Christian Pflaum, Bernried (DE)

(73) Assignee: Ceramic Data Solutions GmbH, Gmunden (AT)

( * ) Notice: Subject to any disclaimer, the term of this patent is extended or adjusted under 35 U.S.C. 154(b) by 0 days.

(21) Appl. No.: 18/557,804

(22) PCT Filed: Apr. 29, 2021

(86) PCT No.: PCT/EP2021/061220
§ 371 (c)(1),
(2) Date: Oct. 27, 2023

(87) PCT Pub. No.: WO2022/228675
PCT Pub. Date: Nov. 3, 2022

(65) Prior Publication Data
US 2024/0265942 A1    Aug. 8, 2024

(51) Int. Cl.
G11B 7/09       (2006.01)
G11B 7/0045   (2006.01)
G11B 7/127     (2012.01)

(52) U.S. Cl.
CPC .......... *G11B 7/0908* (2013.01); *G11B 7/0045* (2013.01); *G11B 7/127* (2013.01)

(58) Field of Classification Search
CPC ...... G11B 7/0908; G11B 7/0045; G11B 7/127
See application file for complete search history.

(56) References Cited

U.S. PATENT DOCUMENTS

| | | | |
|---|---|---|---|
| 3,918,803 A * | 11/1975 | Friesem | H04N 9/3108 250/329 |
| 4,069,487 A | 1/1978 | Kasai et al. | |
| 4,214,249 A | 7/1980 | Kasai et al. | |
| 4,394,661 A | 7/1983 | Peeters | |
| 4,397,923 A | 8/1983 | Yasuda et al. | |
| 4,556,893 A | 12/1985 | Rinehart et al. | |
| 4,797,316 A | 1/1989 | Hecq et al. | |
| 4,999,278 A | 3/1991 | Bouldin | |
| 5,063,556 A | 11/1991 | Chikuma | |
| 5,761,111 A | 6/1998 | Glezer | |

(Continued)

FOREIGN PATENT DOCUMENTS

| | | |
|---|---|---|
| CN | 110653494 | 1/2020 |
| DE | 19724214 | 12/1998 |

(Continued)

OTHER PUBLICATIONS

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

(Continued)

*Primary Examiner* — Andrew Sasinowski
(74) *Attorney, Agent, or Firm* — Lewis & Reese, PLLC

(57) ABSTRACT

The present invention relates to a method of concurrently storing visible grey scale or color information of an image and additional digital information on a data carrier.

23 Claims, 12 Drawing Sheets

(56) References Cited

U.S. PATENT DOCUMENTS

| | | | |
|---|---|---|---|
| 6,039,898 A | 3/2000 | Glushko | |
| 6,120,907 A | 9/2000 | Tahon et al. | |
| 6,133,986 A | 10/2000 | Johnson | |
| 6,143,468 A | 11/2000 | Ohno et al. | |
| 6,171,730 B1 | 1/2001 | Kuroda et al. | |
| 6,214,250 B1 | 4/2001 | Moh et al. | |
| 6,340,543 B1 | 1/2002 | Nagamura et al. | |
| 6,543,691 B1 | 4/2003 | Lemelson et al. | |
| 8,462,605 B2 | 6/2013 | Ferren et al. | |
| 10,181,336 B1 | 1/2019 | Georgiou et al. | |
| 10,315,276 B2 | 6/2019 | Wagner et al. | |
| 10,719,239 B2 | 7/2020 | Rowstron et al. | |
| 2002/0028015 A1 | 3/2002 | Tack-Don et al. | |
| 2002/0079297 A1 | 6/2002 | Harrison | |
| 2002/0164069 A1 | 11/2002 | Nagano et al. | |
| 2003/0186624 A1 | 10/2003 | Koike et al. | |
| 2003/0189228 A1 | 10/2003 | Ieong et al. | |
| 2004/0169847 A1* | 9/2004 | Dukler | G07D 7/1205 356/71 |
| 2005/0181089 A1 | 8/2005 | Ogawa et al. | |
| 2005/0208392 A1 | 9/2005 | Yamamoto | |
| 2006/0044385 A1 | 3/2006 | Wurm et al. | |
| 2006/0119743 A1 | 6/2006 | Lin | |
| 2006/0120262 A1 | 6/2006 | Kiyono | |
| 2006/0147841 A1 | 7/2006 | Ohmi et al. | |
| 2006/0196945 A1 | 9/2006 | Mendels | |
| 2008/0165634 A1* | 7/2008 | Brooks | G11B 5/09 |
| 2008/0238611 A1 | 10/2008 | Costa et al. | |
| 2008/0320205 A1 | 12/2008 | Lunt et al. | |
| 2009/0207395 A1 | 8/2009 | Kasono | |
| 2009/0245077 A1 | 10/2009 | Ueda et al. | |
| 2010/0040960 A1 | 2/2010 | Piao et al. | |
| 2010/0068444 A1 | 3/2010 | Asplund et al. | |
| 2010/0135147 A1 | 6/2010 | Bard et al. | |
| 2010/0151391 A1 | 6/2010 | Neogi et al. | |
| 2010/0289186 A1 | 11/2010 | Longo et al. | |
| 2011/0318695 A1 | 12/2011 | Hwang et al. | |
| 2013/0273259 A1 | 10/2013 | Depardieu et al. | |
| 2015/0077535 A1 | 3/2015 | Izatt et al. | |
| 2015/0302926 A1 | 10/2015 | Shiozawa et al. | |
| 2015/0324677 A1 | 11/2015 | Talyansky et al. | |
| 2015/0382476 A1 | 12/2015 | Zenou et al. | |
| 2016/0088181 A1* | 3/2016 | Chen | G06K 15/4095 358/2.1 |
| 2016/0118077 A1 | 4/2016 | Lunt et al. | |
| 2016/0199935 A1 | 7/2016 | Chen et al. | |
| 2018/0039806 A1 | 2/2018 | Harrison | |
| 2018/0130531 A1 | 5/2018 | Ahner et al. | |
| 2018/0246415 A1 | 8/2018 | Xalter et al. | |
| 2019/0273025 A1 | 9/2019 | Chen et al. | |
| 2019/0324240 A1 | 10/2019 | Shroff et al. | |
| 2019/0353912 A1 | 11/2019 | Chen et al. | |
| 2020/0075383 A1 | 3/2020 | Minemura | |
| 2020/0142171 A1 | 5/2020 | Xiong et al. | |

FOREIGN PATENT DOCUMENTS

| | | |
|---|---|---|
| DE | 102014118497 | 6/2017 |
| EP | 2157533 | 2/2010 |
| EP | 3109058 | 12/2016 |
| EP | 3031785 | 10/2018 |
| EP | 3779987 | 2/2021 |
| EP | 3955248 | 2/2022 |
| EP | 4044182 | 8/2022 |
| JP | H02-215587 | 8/1990 |
| JP | H02-277689 | 11/1990 |
| JP | 2002-351055 | 3/2002 |
| JP | 2003-137677 | 5/2003 |
| JP | 2004-062981 | 2/2004 |
| JP | 3913319 | 5/2007 |
| JP | 2007-319921 | 12/2007 |
| JP | 6689067 | 4/2020 |
| KR | 20010112497 | 12/2001 |
| WO | 91/13440 | 9/1991 |
| WO | 99/45441 | 9/1999 |
| WO | 2000/073983 | 12/2000 |
| WO | 2021/028035 | 2/2021 |
| WO | 2022/002418 | 1/2022 |
| WO | 2022/002444 | 1/2022 |
| WO | 2022/033701 | 2/2022 |
| WO | 2022/033800 | 2/2022 |
| WO | 2022/037754 | 2/2022 |
| WO | 2022/171522 | 8/2022 |
| WO | 2022/194354 | 9/2022 |

OTHER PUBLICATIONS

Watanabe M., et al., "Three-Dimensional Optical Data Storage in Vitreous Silica," Japanese Journal of Applied Physics, JP, vol. 37, No. 12 B, part 02, Dec. 15, 1998.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec. 17, 2020 from website://glassproperties.com/glasses.

A. Laskin et al., "Beam-shaping unit for micromachining," Proceedings of SPIE—The Int'l Soc. for Optical Eng'g (Sep. 2013).

Haight, Richard, et al., "High Resolution Material Ablation and Deposition with Femtosecond Lasers and Applications to Photomask Repair," Journal of Modern Optics, Nov. 10-Dec. 15, 2004, vol. 51, No. 16-18, pp. 2781-2796.

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

International Search Report and Written Opinion regarding corresponding PCT Application No. PCT/EP2021/061220, mailed Jan. 24, 2022.

* cited by examiner

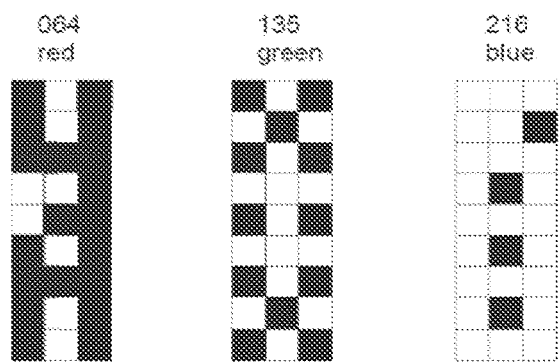
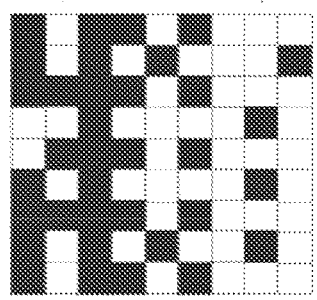
*Figure 3a*
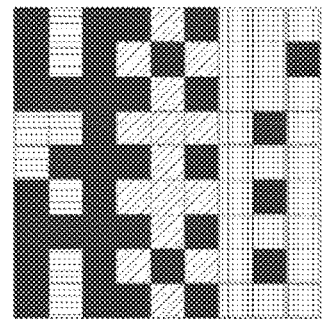
*Figure 3b*
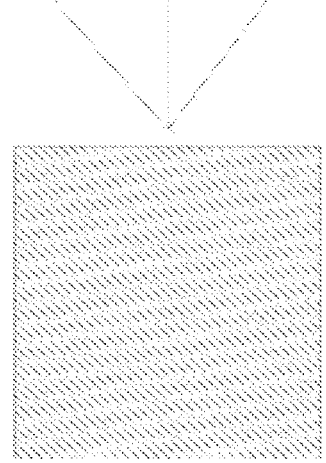

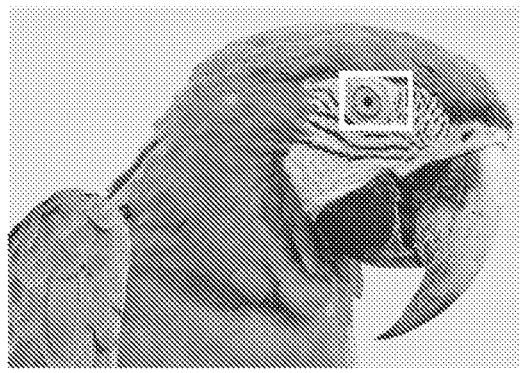
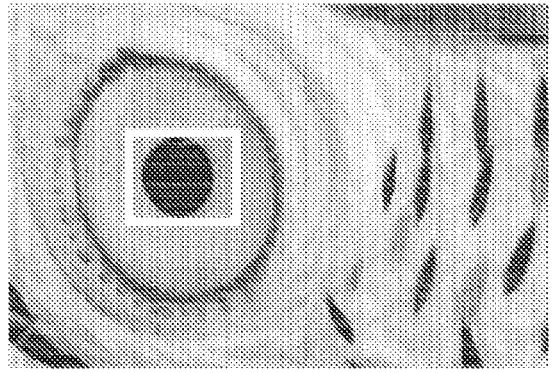
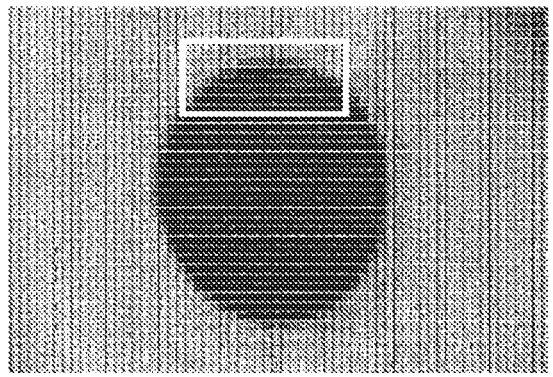
Figure 3c
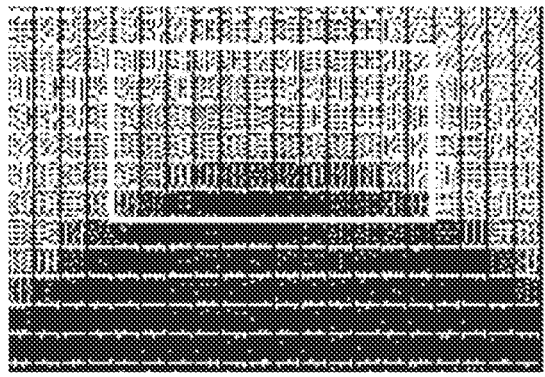
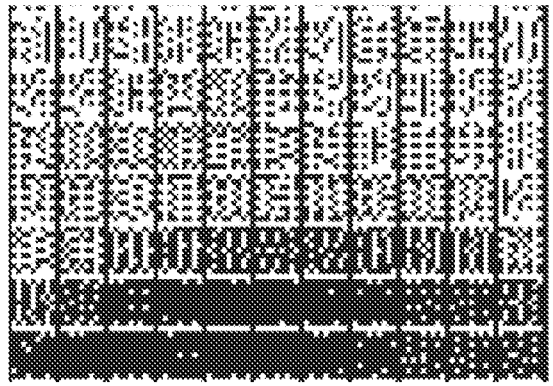

HYBRID DIGITAL AND ANALOG DATA STORAGE

INTRODUCTION

The present invention relates to a technique of improved data storage and, more particularly, to methods of concurrently storing visible grey scale or color information of an image combined with additional digital information on a data carrier such as a ceramic data carrier. The present invention further relates to methods of reading out said additional digital information.

PCT Application Publication WO 2021/028035 discloses a method for long-term storage of information utilizing a coated ceramic substrate and encoding information by ablating or otherwise manipulating the coating by means of a laser beam and/or a focused particle beam. Said information may be encoded in an analog format using, e.g., letters, symbols, images and the like or in a digital format using, e.g., a QR code.

From printing technology it is known to use half tone to print, e.g., a grey scale photograph or image. For this purpose, dots of the same size or spacing are printed which create an optical illusion of various shades of grey. Applying this half tone technique to the data carriers of WO 2021/028035 one may segment an image to be encoded into pixels, attribute a grey scale value to each pixel and ablate a corresponding fraction of the pixel's area (using the optical contrast between the ceramic substrate and the coating material). This is most easily achieved by creating more or less recesses of the same size within such pixels as this may allow for utilizing one and the same laser beam for each grey scale value.

For example, in order to encode 17 grey scale values one may attribute a 4×4 matrix of 16 potential recess positions to each pixel and create between zero and 16 recesses per pixel in order to encode the corresponding grey scale value. However, if the grey scale value corresponds, for example, to a single recess per pixel, there are 16 different options to position said single pixel within the 4×4 matrix. While these 16 options create, in essence, the same optical illusion in terms of the grey scale value apparent to the human eye, these 16 alternative positions of the single recess allow for encoding additional information, which would otherwise be wasted.

The present invention is, in essence, based on the idea to utilize these permutations for encoding additional information.

SUMMARY

Accordingly, the present invention relates to a method of concurrently storing grey scale information of an image and additional digital information. The method comprises providing a data carrier and creating a plurality of recesses in a surface of the data carrier by using a laser and/or a focused particle beam in order to encode information on the data carrier. The plurality of recesses are grouped in pixels forming an image, each pixel comprising between zero and M recesses located at a subset of zero to M positions of N predetermined positions attributed to said pixel. The number of recesses of a given pixel defines a visual grey scale value of said pixel and the subset of positions of a given pixel defines additional digital information attributed to said pixel.

In the above-mentioned example, each pixel would have a square shape with 16 predetermined positions arranged in a square 4×4 pattern. Each pixel would then comprise a certain number of recesses between zero and 16, for example 7 recesses, located at a subset of 7 positions of the 16 predetermined positions. The number of recesses such as 7 would then define a grey scale value attributed to said pixel and the specific subset of positions, i.e. which of the 16 predetermined positions are occupied with a recess, defines additional digital information attributed to said pixel. One may, for example, define 16 permutations for each grey scale value (apart from the grey scale values 0 and 16 which allow for only one permutation each) leading to 8 bit of digital information, whereas only 4 bit of analog grey scale information are encoded.

Said additional information may comprise one or a combination of a more precise grey scale value of said pixel, a color or color value of said pixel, an intensity of any of the colors red, green and blue of said pixel, a letter, a number, a symbol, audio information, video information. Thus, the analog information encoded on the data carrier may yield a rough grey scale or half tone version of the encoded image, whereas the additional digital information allows for generating a much more precise grey scale or half tone version of said image. Alternatively, the additional digital information may comprise additional color information which allows for transforming the encoded image into a color version of said image.

It is further envisaged that the additional digital information comprises additional information not necessarily related to the image. For example, the grey scale pixels could have encoded therein a text with letters, numbers and/or symbols of said text being attributed to the pixels.

Moreover, audio and/or video information could be embedded in the additional digital information. For example, the grey scale or color image could constitute a frame of a video signal and the additional information attributed to the pixels of said image could comprise the grey scale or color information for one or more further frames of the video signal. This grey scale or color information for one or more further frames of the video signal could again comprise all pixels of the one or more further frames or, alternatively, encode the differences between the subsequent frame(s) and the current frame. Thus, two or more frames of a video signal could be saved or encoded within a single image. Similarly, an additional audio signal may be embedded within the additional information attributed to the pixels.

As mentioned above, the N predetermined positions of each pixel may be arranged in a rectangular or a square pattern. This is, however, not required and each pixel may also have a different shape. For example, triangular or hexagonal pixels with appropriately arranged predetermined positions may be utilized as well. Similarly, the recesses may have any shape and/or cross section. However, in terms of simple manufacturing the shape of the recesses is preferably cylindrical or cone-like.

While it is preferred to utilize each of the N predetermined positions for recesses to achieve as many grey scale values as possible, i.e. N=M, one may also use only less grey scale values, i.e. M<N. For example, in the above-mentioned case of a square 4×4 pattern it may be preferable to only place between zero and 15 (or between one and 16) recessed in each pixel as this corresponds to 16 grey scale values (rather than 17), i.e. to 4 bit. Accordingly, M may be smaller than N, yet it is preferred that M>N/2, preferably M>9N/10. In particular, M may be equal to N−1.

In view of the above, it should be evident that the plurality of recesses being grouped in pixels forming an image with each pixel comprising between zero and M recesses located at a subset of zero to M positions of N predetermined positions attributed to said pixel does not require a pixel to be present for each of zero to M recesses per pixel. For example, if N=M=16 each pixel may contain at least one recess because the case of zero recesses per pixel is not required for 4 bit. It is, however, preferred that at least some pixels (preferably at least 5% of the pixels) have less than M/4, preferably less than M/8, recesses. Preferably, at least some pixels (preferably at least 5% of the pixels) have zero or one recess. It is also preferred that at least some pixels (preferably at least 5% of the pixels) have more than 3M/4, preferably more than 7M/8, recesses. Preferably, at least some pixels (preferably at least 5% of the pixels) have M−1 or M recesses.

Preferably, each pixel has an area of at most 10 $\mu m^2$, preferably at most 1 $\mu m^2$ and most preferably at most 0.1 $\mu m^2$.

In the simplest case, N may be 4. It is, however, preferred that N is at least 9, more preferably at least 16. As mentioned above, the pattern need not be a square pattern. Accordingly, N need not be a square number. More preferably N is at least 20, 25 or 30 and most preferably at least 35, 40 or 50.

In the context of the present invention, any data carrier which allows for providing recesses therein may be utilized. In its most simple form, the data carrier may consist of a single layer of a homogenous material and recesses may be through-holes providing optical contrast in transmission mode. It is, however, preferred that providing a data carrier comprises providing a substrate and coating the substrate with a first coating of a material different from the material of the substrate. Creating a plurality of recesses in a surface of the data carrier than preferably comprises creating a plurality of recesses in the first coating. As described in WO 2021/028035, the materials of the substrate and the first coating are preferably chosen so as to create an optical contrast between these materials. For example, the substrate may have a black or dark impression, whereas the coating may have a white or bright impression or vice versa. If the recesses extend through the coating towards the substrate, each recess corresponds to a white printed dot on a black background or vice versa allowing to employ the known half tone from printing techniques.

It is particularly preferred that the substrate is a ceramic substrate. Preferred ceramic materials are described in WO 2021/028035, which is hereby incorporated by reference in its entirety. It is particularly preferred that the ceramic substrate comprises an oxidic ceramic. Preferably, the ceramic substrate comprises at least 90%, more preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material. It is further preferred that the ceramic substrate comprises a non-oxidic ceramic. Preferably, the ceramic substrate comprises at least 90%, more preferably at least 95%, by weight of one or a combination of a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $WSi_2$, PtSi, $Mg_2Si$ or any other non-oxidic ceramic material.

Preferably, the substrate comprises a glassy transparent ceramic material or a crystalline ceramic material as this allows for coating of the data carrier in transmissions mode. Preferably the substrate comprises one or a combination of: sapphire ($Al_2O_3$), silica ($SiO_2$), zirconium silicate (Zr($SiO_4$)), $ZrO_2$, boron oxide, sodium oxide, potassium oxide, lithium oxide, zinc oxide and magnesium oxide.

Preferably, the substrate has a thickness of at most 200 µm, more preferably at most 150 µm, more preferably at most 100 µm and most preferably 50 µm. This is particularly advantageous in the terms of storing large amounts of data in small volumes as such substrates being coated with a very thin first coating may even be wound up in a row.

In light of the envisaged long-term stability of the data carrier, it is particularly preferred that the coating layer comprises one or a combination of the following materials: a metal such as Cr, Co, Ni, Fe, Al, Ti, Si, W, Zr, Ta, Th, Nb, Mn, Mg, Hf, Mo, V; a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; or a metal silicide such as $TiSi_2$, $ZrSi_2$, $MoSi_2$, MoSi, $WSi_2$, PtSi, $Mg_2Si$.

Preferably, the visual grey scale image defined by the pixels is discernable by the naked eye or by means of refractive, diffractive or reflective optical elements without further processing. In other words, the encoded grey scale image may be discernable using standard optical magnification (e.g., by means of a microscope) without any decoding or analyzing processing being required. By contrast, the additional digital information encoded on the data carrier may not be discernable in such a way and may only be decoded using suitable decoding means. For example, each subset of positions of each pixel may be imaged by, e.g., a camera and the subsets of positions may be compared with predetermined subsets in order to attribute the additional digital information to each pixel. Consequently, it is preferred that the single recesses of each pixel are not discernable by the naked eye.

The present invention further relates to a method of reading out additional digital information from an image stored on a data carrier, preferably from an image stored according to the method discussed above. According to said method, the data carrier with an image is provided with each pixel of said image comprising between zero and M recesses. For each pixel, the subset of positions at which a recess is present is identified and a predetermined information is attributed to each pixel in accordance with the identified subset of positions at which a recess is present.

The step of identifying the subset of positions at which a recess is present may be performed with any imaging technique using, e.g., a microscope. Particularly suitable and preferred read out techniques are described in PCT Application Publication WO 2022/037754 and PCT Application Publication WO 2022/194354, both of which are herewith incorporated by reference in its entirety.

Attributing a predetermined information to each pixel in accordance with the identified subset of positions at which a recess is present may then be performed by means of a particular algorithm or by simply comparing the recess pattern with a look-up table.

Preferably, the predetermined information comprises one or a combination of a grey scale value of said pixel, a color or color value of said pixel, an intensity of any of the colors red, green and blue of said pixel, a letter, a number, a symbol, audio information, video information.

The method may further comprise displaying, for each pixel of the image, the predetermined information. For example, a high resolution grey scale image or a color image may be displayed after reading out the additional digital information from the image. Alternatively, a text generated from the letters allocated to each pixel may be displayed.

The concept of the present invention discussed above with regard to a grey scale image may analogously be employed for a color image. Accordingly, the present invention further relates to a method of concurrently storing RGB color information (or other color information, e.g. CMYK color information) of an image and additional digital information. The method comprises providing a data carrier and creating a plurality of recesses in a surface of the data carrier by using a laser and/or a focused particle beam in order to encode information on the data carrier. The plurality of recesses are grouped in pixels forming an image, wherein NR+NG+NB predetermined positions are attributed to each pixel, said NR+NG+NB predetermined positions comprising NR predetermined R positions, NG predetermined G positions and NB predetermined B positions. Each pixel comprises between zero and MR recesses located at a subset of zero to MR positions of the NR predetermined R positions. Furthermore, each pixel comprises between zero and MG recesses located at a subset of zero to MG positions of the NG predetermined G positions. Moreover, each pixel comprises between zero and MB recesses located at a subset of zero to MB positions of the NB predetermined B positions. The number of recesses at predetermined R positions, nR, of a given pixel defines an intensity of the color red, the number of recesses at predetermined G positions, nG, of a given pixel defines an intensity of the color green, and the number of recesses at predetermined B positions, nB, of a given pixel defines an intensity of the color blue. The subset of R positions and/or the subset of G positions and/or the subset of B positions of a given pixel defines additional digital information attributed to said pixel.

As is evident from the above, the concept of this second (color) aspect of the present invention is, in essence, identical to that of the first (grey scale) aspect of the present invention. Accordingly, all preferred features discussed above with respect to the first aspect may be employed analogously for the second aspect. For example, the NR+NG+NB predetermined positions of each pixel may be arranged in rectangular, square, hexagonal or triangular pattern and the shape of the recesses may be cylindrical or cone-like. Similarly, N may be at least 4, 9 or 16, preferably at least 20, 25 or 30 and most preferably at least 35, 40 or 50. While M and/or N could theoretically be different for each color, it would be most practical to employ the same M and N for red, green and blue. If these number differ, however, it is preferred that NG is greater than NR and NB for physiological reasons.

Since more recesses are required in order to encode the different colors, each pixel preferably has an area of at most 30 $\mu m^2$, preferably at most 3 $\mu m^2$, and more preferably at most 0.3 $\mu m^2$.

The additional digital information may comprise a more precise intensity of any of the colors red, green and blue of said pixel, another color or color value of the pixel, a letter, a number, a symbol, audio information, video information.

As discussed above with regard to the first aspect, the data carrier may comprise an encoded substrate. All features discussed above with regard to the substrate and the coating of the first aspect may also be employed for this second aspect.

However, different from the first aspect, the method of the present second aspect may also comprise coating the substrate with a second coating of a photoluminescent or fluorescent material. Preferably, the first and the second coatings are provided on opposite sides of the substrate. Alternatively, the second coating may be provided between the substrate and the first coating.

It is particularly preferred that the second coating comprises three different photoluminescent or fluorescent materials having emission maxima with wavelengths corresponding to red, green and blue, respectively. Thus, the color information of the data carrier may be extracted by illuminating the data carrier with, e.g., white light. The photoluminescent or fluorescent response in red, green and blue will then generate the impression of a color image. For this purpose, it is particularly preferred that, for each pixel, the NR predetermined R positions, the NG predetermined G positions and the NB predetermined B positions are registered to the three corresponding photoluminescent or fluorescent materials. In other words, the recesses at predetermined R positions corresponding to the color red are provided above or below a photoluminescent or fluorescent material having an emission maximum with a wavelength corresponding to red. Thus, the recesses at the predetermined R positions of said pixel will appear red if properly illuminated.

In view of a simple manufacturing process it is preferred that, for each pixel, the predetermined R positions are arranged in a single contiguous area, the predetermined G positions are arranged in a single contiguous area, and the predetermined B positions are arranged in a single contiguous area, preferably each in a single stripe. Moreover, the contiguous areas of one color for two or more adjacent pixels may also be contiguous to each other and form one extended, contiguous area such as a stripe. For example, if the pixels are arranged in a square pattern, the entire area of pixels may be dissected into stripes extended over, e.g., the entire length of the data carrier, the stripes of the three colors red, green and blue forming a repeating pattern along the width direction of RGB-RGB-RGB- . . . .

The present invention further relates to a method of reading out additional digital information from an image stored on a data carrier, said image preferably being stored as discussed above for the second aspect. The method comprises providing a data carrier with an image, each pixel of said image comprising between zero and MR+MG+MB recesses, identifying, for each pixel, the subset of positions at which a recess is present, and attributing a predetermined information to each pixel in accordance with the identified subset of positions in which a recess is present. Again, the predetermined information may comprise an intensity of any of the colors red, green and blue of said pixel, another color or color value of said pixel, a letter, a number, a symbol, audio information, video information.

The identifying step may comprise identifying, for each pixel, the subset of R positions and the subset of G positions and the subset of B position at which a recess is present. The attributing step than preferably comprises attributing an intensity of the colors red, green and blue to each pixel.

Of course, the method may further comprise displaying, for each pixel of the image, the predetermined information. For example, a high resolution color image may be displayed after reading out the respective information.

While the above-mentioned method of reading out the additional digital information may be considered to be a method of digital decoding because the subset of positions at which a recess is present has to be measured and, for example, compared with predefined subsets in order to attribute the corresponding predetermined information to each pixel, the additional digital information may also be read out by means of a pure optical technique. According to this alternative, the present invention relates to a method of reading out additional digital information from an image stored on a data carrier, which method comprises providing a data carrier with an image, each pixel of said image comprising between zero and MR+MG+MB recesses, and illuminating the data carrier with an RGB display in order to generate a color image.

As explained above, for each pixel, certain recess positions correspond to the colors red, green and blue. Thus, if those recesses are illuminated with red, green and blue light by means of, e.g., a RGB display, the respective recesses of each pixel will appear red, green or blue. Of course, this requires that the RGB display is correctly positioned with respect to the data carrier. It is therefore preferred that the RGB display comprises red, green and blue pixels and that the NR predetermined R positions, the NG predetermined G positions and the NB predetermined B positions of each pixel of the data carrier are registered to the corresponding red, green and blue pixels of the RGB display. For this purpose, the data carrier may comprise one or more markers allowing for proper registration. Alternatively, a certain section of the data carrier may comprise several test pixels, which are only properly illuminated if the data carrier is correctly positioned on or with respect to the RGB display.

Another alternative method of reading out additional digital information from an image stored on a data carrier may be based on the second coating comprising a photoluminescent or fluorescent material discussed above. The method of this alternative comprises providing a data carrier with an image, the data carrier comprising a substrate, a first coating of a different material and a second coating of a photoluminescent or fluorescent material, each pixel of said image comprising between zero and MR+MG+MB recesses in the first coating, and illuminating the data carrier with white light in order to generate a color image. Since the recesses of each pixel corresponding to the colors red, green and blue are properly registered with, e.g., an underlying photoluminescent or fluorescent material emitting red, green or blue light, the correct color image will automatically be generated if the data carrier is illuminated with white light.

BRIEF DESCRIPTION OF THE DRAWINGS

The present invention will be further elucidated with reference to the Figures, which show:

FIGS. 3a and 3b a scheme for attributing RGB color information of a color pixel to a pattern of recesses which result in a visible grey scale pixel;

FIG. 3c an example of a scheme for identifying pixels on a data carrier;

DETAILED DESCRIPTION

Figure 1A:
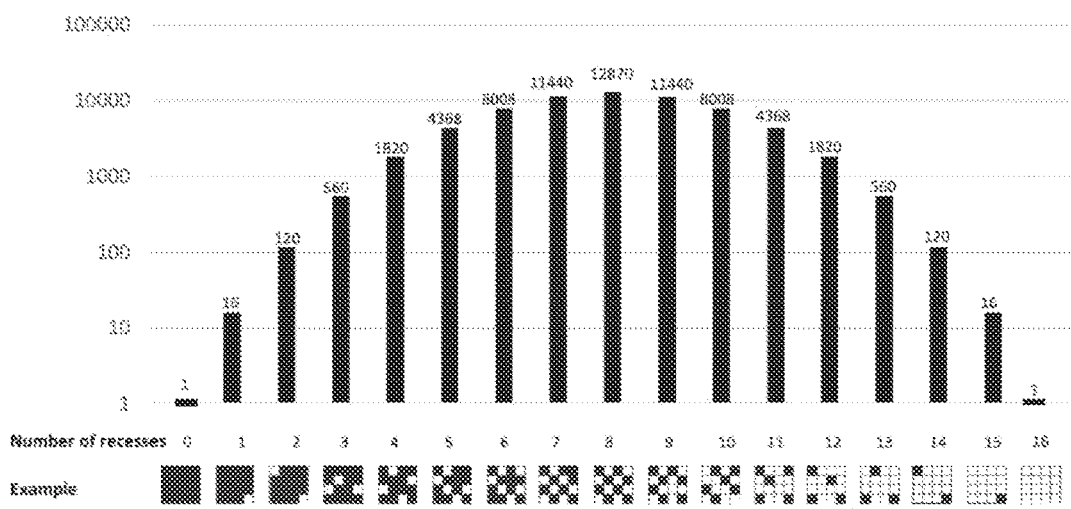
FIG. 1a a graph showing the number of permutations for zero to 16 recesses on 16 predetermined positions.

FIG. 1a shows the number of possible permutations for zero to 16 recesses on 16 predetermined positions, exemplified for a square 4×4 matrix. For each number of recesses between zero and 16 one exemplary arrangement of recesses (or white fields) is illustrated. While there is only one option to have no recess (left end) or 16 recesses (right end) present in one pixel, a single recess or 15 recesses may be arranged in 16 different ways. By contrast, there are 12,870 permutations possible for placing 8 recesses onto 16 predetermined positions. The number of permutations may generally be calculated as $N!/[(N-M)!M!]$, where N is the number of predetermined positions and M is the number of recesses.

Figure 1B:
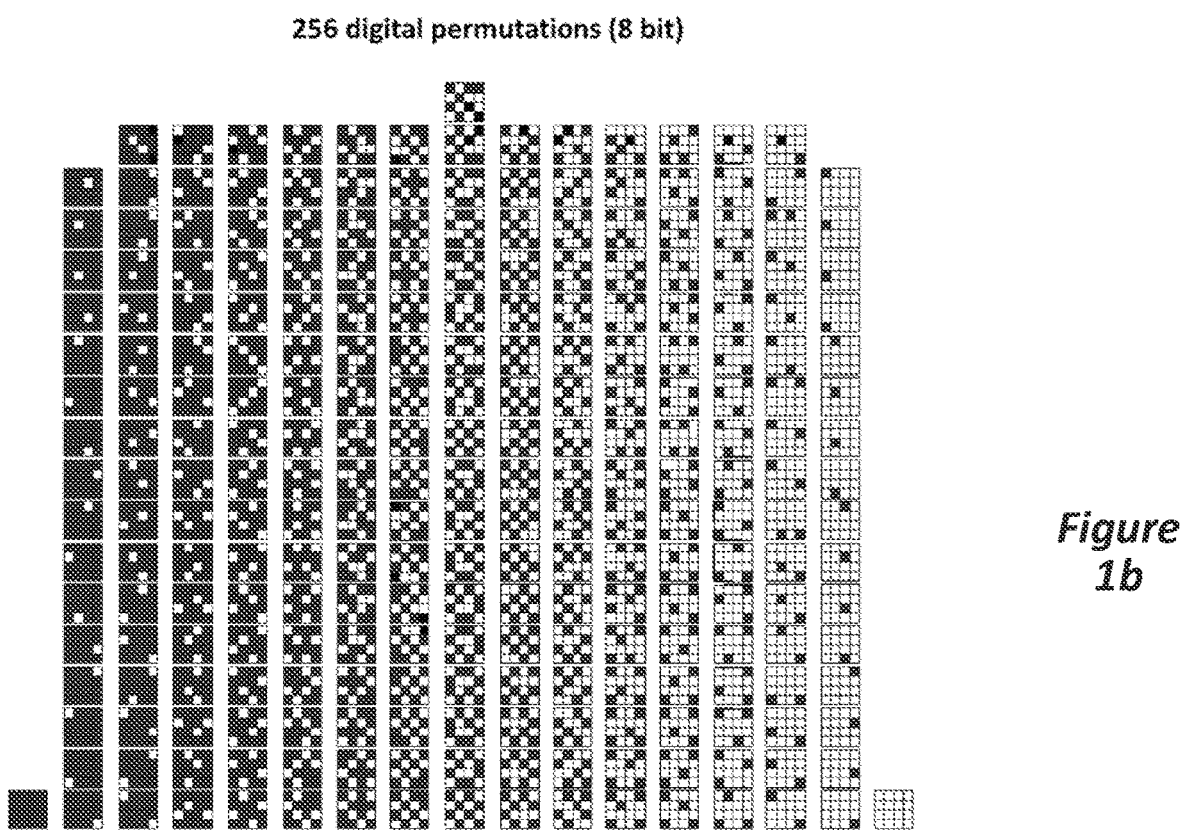
FIG. 1b a scheme for attributing 256 digital permutations to 17 analog grey values.

FIG. 1b shows an exemplary scheme for attributing additional digital information to pixels corresponding to a certain grey scale value. In FIG. 1b, 17 analog grey scale values are displayed changing from black (left end) to white (right end). Since black and white each allow for a single permutation only, this has to be compensated if a total of 256 digital permutations (8 bit) are required. In the example of FIG. 1b, this is achieved by providing 17 different permutations wherever possible and 18 permutations for the case of 8 recesses. Thus, a total of 2×1+2×16+12×17+1×18=256 permutations, i.e. 8 bit, are possible. Of course, other arrangements would be possible as well even though a symmetrical allocation of digital grey scale values to the analog grey scale values is preferable. Moreover, as is evident from FIG. 1a, one could also store 512 or 1024 permutations (i.e., 9 or 10 bit) in the 4×4 pixels utilizing a more asymmetric allocation.

Figure 2A:
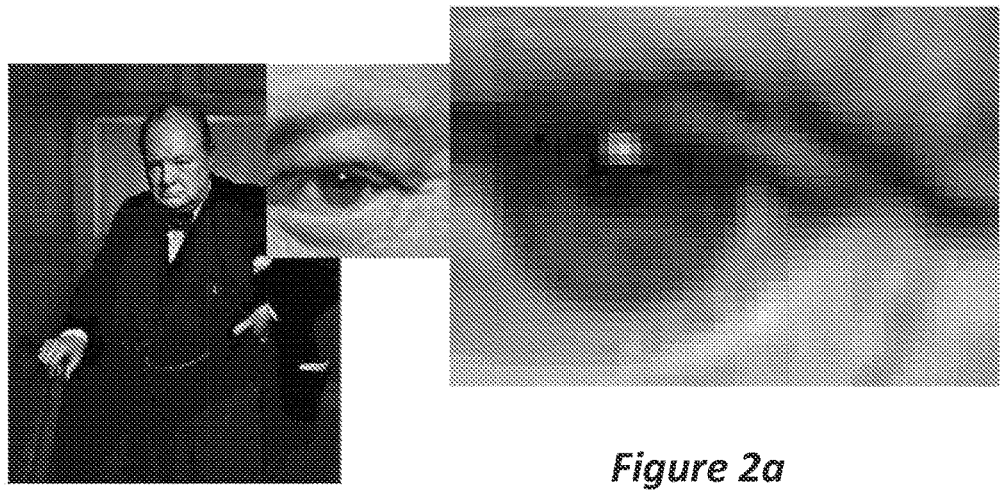
FIGS. 2a-2c a grey scale image exemplifying the technique of the present invention.
Figure 2B:
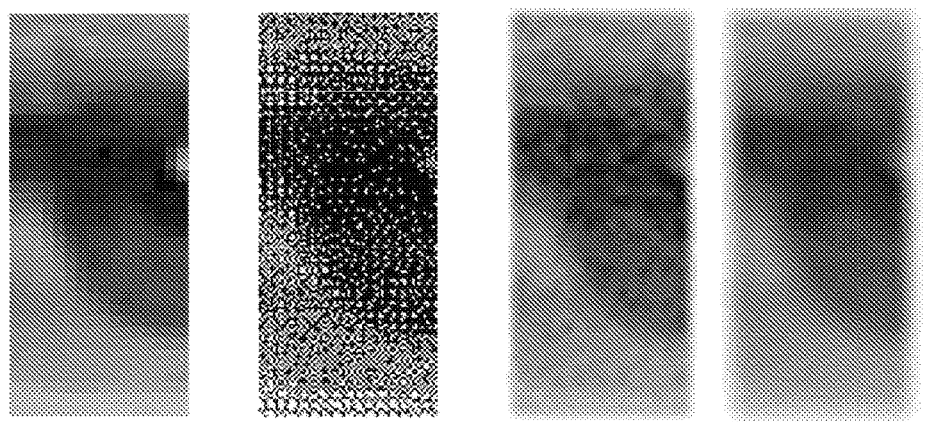
Figure 2C:
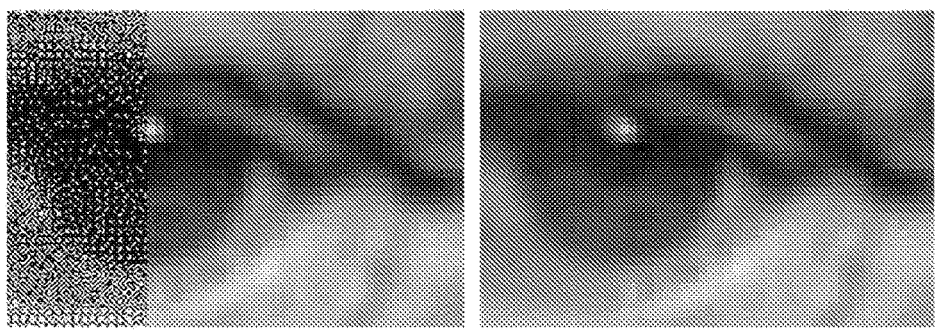

The present invention is now based on the idea that each row of the scheme shown in FIG. 1b, i.e. the number of recesses of a given pixel, defines an analog grey scale value of said pixel (schematically shown at the bottom of FIG. 1b) and that the subset of positions of a given pixel (i.e., the specific permutation pattern) defines additional digital information attributed to said pixel (e.g. one out of 256 digital grey scale values). This is exemplary shown in FIGS. 2a-c. FIG. 2a shows a digital grey scale image and two magnified sections at different magnification, the right one showing different pixels having different grey scales. In FIG. 2b, each pixel is replaced by a pixel in accordance with FIG. 1b (middle), the blurry version of which (right) corresponding to a 4 bit grey scale image having less quality than the original. However, on the basis of the additional digital information being present on a microscopic level, the high quality grey scale image may again be reconstructed (FIG. 2c).

As outlined above, this concept may also be employed for color images, as schematically shown in FIGS. 3a-3c. The plurality of recesses in this case are grouped in square pixels (one of which is shown in FIG. 3a) forming an image with each recess again being depicted as a white square, wherein 3×27 predetermined positions are attributed to each pixel, said 3×27 predetermined positions comprising 27 predetermined R positions (arranged in a 3×9 pattern), 27 predetermined G positions and 27 predetermined B positions. Each pixel comprises between zero and 27 (here: 8) recesses located at a subset of zero to 27 positions of the 27 predetermined R positions. Furthermore, each pixel comprises between zero and 27 (here: 15) recesses located at a subset of zero to 27 positions of the 27 predetermined G positions. Moreover, each pixel comprises between zero and 27 (here: 23) recesses located at a subset of zero to 27 positions of the 27 predetermined B positions. The number of recesses at predetermined R positions, nR, of a given pixel defines an intensity of the color red, the number of recesses at predetermined G positions, nG, of a given pixel defines an intensity of the color green, and the number of recesses at predetermined B positions, nB, of a given pixel defines an intensity of the color blue. The subset of R positions and/or the subset of G positions and/or the subset of B positions of a given pixel defines additional digital information attributed to said pixel.

Now, if the pixel shown at the bottom of FIG. 3a is, for example, illuminated with red, green and blue light in the corresponding pixel sections (here: three vertical stripes) as shown at the top of FIG. 3b, said pixel emits light with red, green and blue intensities according to the numbers of R, G and B positions (here: 8, 15 and 23). Viewed from a proper distance said pixel will appear to have one uniform, mixed color (here: mid blue) as schematically shown at the bottom of FIG. 3b. However, the microstructure of the pixel, i.e. the subset of R positions and the subset of G positions and the subset of B positions will allow for reconstructing a high resolution color image.

Of course, when reading out the additional digital information encoded on the data carrier, it will be required to identify the pixels containing said additional digital information, which may be difficult if one imagines, for example, the various permutations shown in FIG. 1b to be arranged immediately adjacent to one another. It is thus preferred that the data carrier comprises multiple allocation elements which allow a reading device or a processor to allocate certain areas of the data carrier to pixels. FIG. 3c shows an example of such allocation elements for identifying pixels on a data carrier.

The first two images of FIG. 3c show a parrot and its eye, respectively. Zooming in further, the third image of FIG. 3c (showing only the pupil and a part of the eye) gives the impression of an underlying square pattern, which is more clearly visible in the further magnifications of the fourth and fifth image of FIG. 3c. As is evident from the fifth image, the recesses on the data carrier form continuous vertical lines in black (i.e. continuous lines without any recess) as well as continuous horizontal lines in white (i.e. continuous lines of recesses) interrupted only by the continuous vertical lines in black. These lines are easily discernable by the human eye (or similarly an AI or other algorithm utilized in the processor of the reading device) and clearly define each pixel as having two black vertical and two white horizontal boundaries.

Of course, other allocation elements are envisaged as well. For example, each pixel may be identified by four corners. Alternatively, another large scale pattern might be utilized. For example, a repeating pattern of a pair of a completely white pixel and a completely black pixel may be provided.

Figure 4:
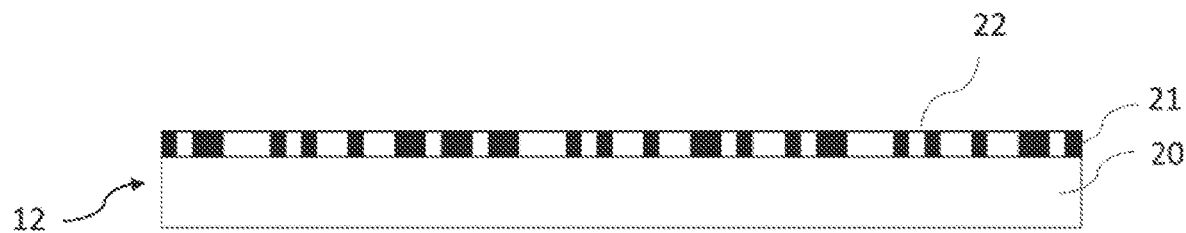
FIG. 4 a cross section through a data carrier encoded with a grey scale image.

FIG. 4 shows a cross section through an exemplary data carrier 12, on which grey scale information of an image and additional digital information is stored. In the example, the data carrier 12 comprises a substrate 20 and a coating 21. Recesses 22 extend through the entire thickness of the coating 21. If there is optical contrast between the substrate 20 and the coating 21, the recesses 22 will create a different optical impression in reflection mode than the coating. Moreover, if the substrate 20 is transparent, the encoded image may also be visible in transmission mode. As discussed above, the recesses 22 may be arranged in pixels such as those of the scheme shown in FIG. 1b in order to encode additional digital information.

Figure 5A:
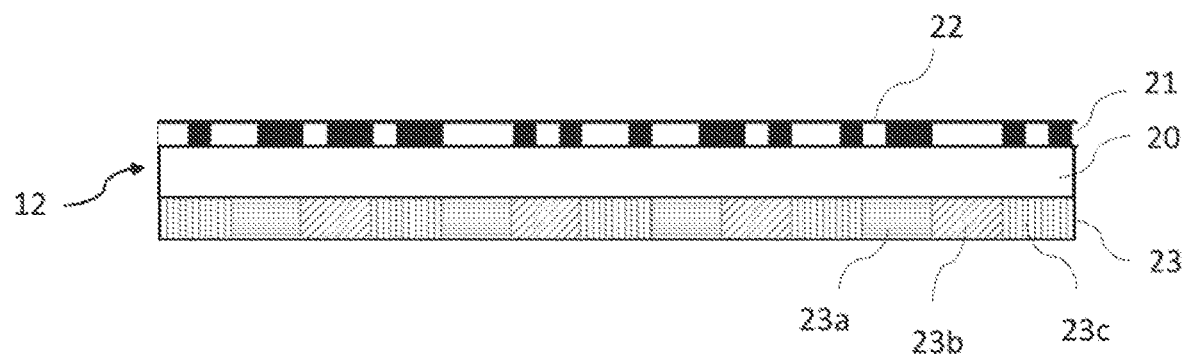
FIGS. 5a and 5b cross sections through a data carrier encoded with a color image utilizing a photoluminescent layer.

FIG. 5a shows a cross section through another exemplary data carrier 12 comprising a substrate 20 and a coating 21 with recesses 22 similar to those of FIG. 4. However, in case of FIG. 5a, an additional photoluminescent layer 23 is present. Said photoluminescent layer 23 comprises different sections 23a, 23b and 23c having emission wavelengths in the red, green and blue spectrum, respectively. Accordingly, if the data carrier shown in FIG. 5a is illuminated with white light, recesses 22 positioned above sections 23a of the photoluminescent layer 23 will appear red. Similarly, recesses 22 positioned above sections 23b or 23c of the photoluminescent layer 23 will appear green or blue. Of course, this requires the data carrier 20 to be transparent. Moreover, it will be evident to the skilled person that the sections 23a, 23b and 23c of the photoluminescent layer 23 of the data carrier 12 have to be properly registered with the predetermined R, G and B positions. For example, the sections 23a, 23b and 23c could be elongated stripes extending along the entire length of the data carrier with the width of each stripe corresponding to one third of the width of the pixel (see FIG. 3b). Yet, other arrangements would of course also be possible.

Figure 5B:
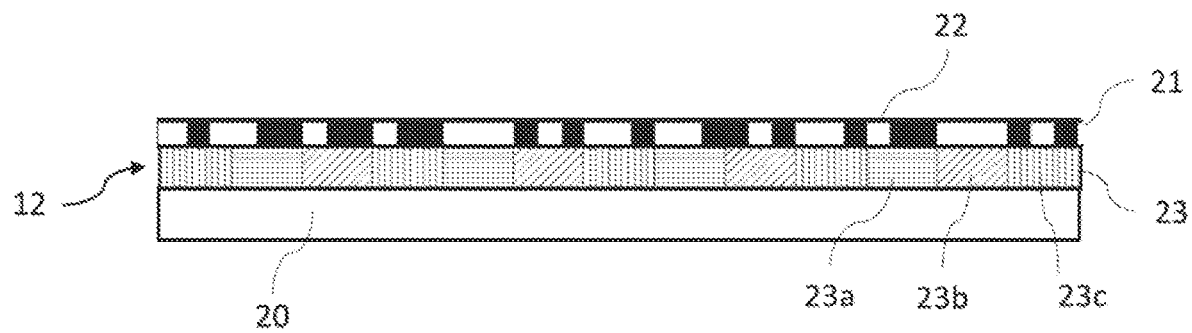

As shown in FIG. 5b, the photoluminescent layer 23 may also be arranged between the substrate 20 and the coating 21. In this case, reading out may also be possible in reflection mode.

Figure 6:
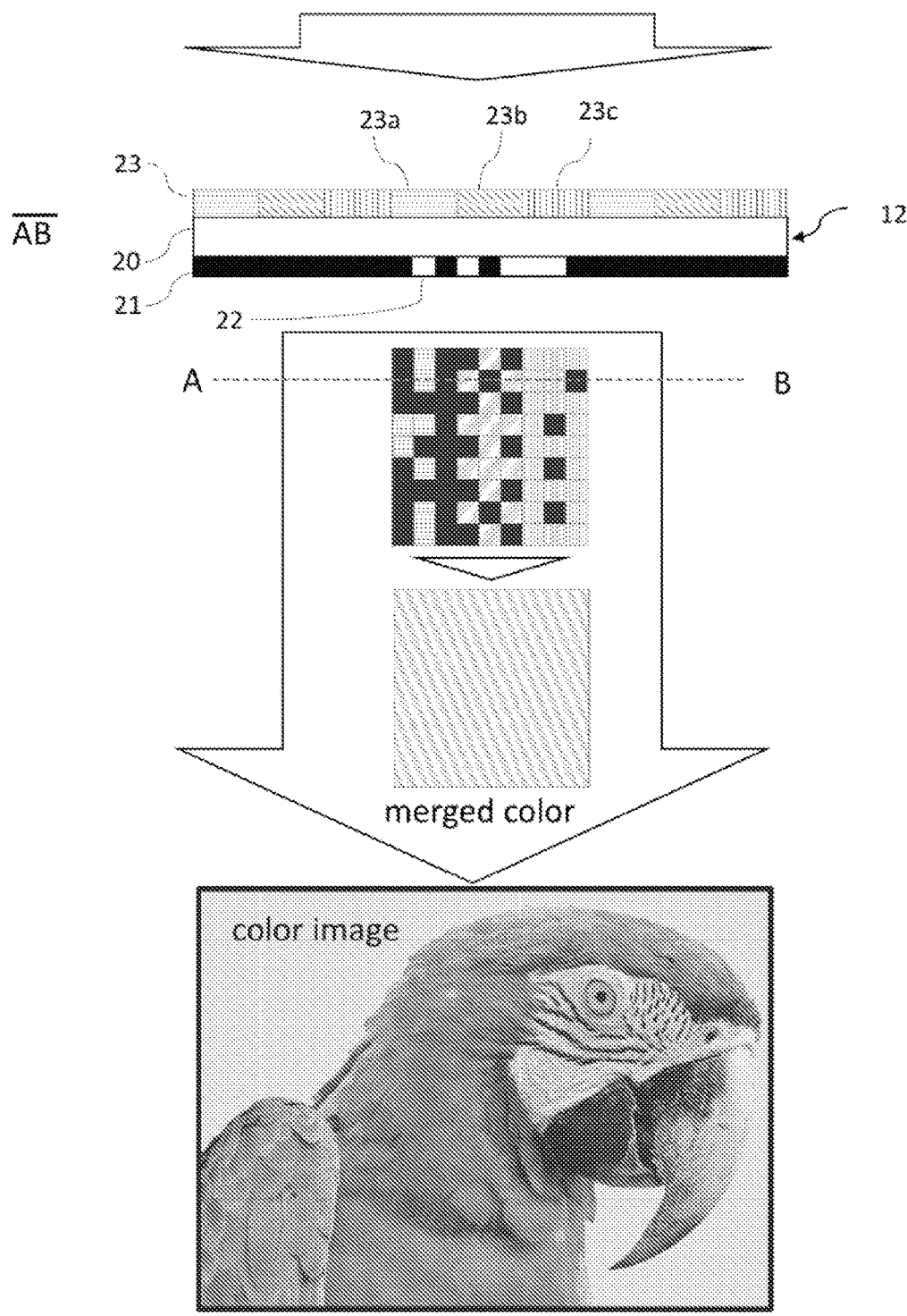
FIG. 6 schematically a first decoding method.

FIG. 6 schematically shows a first decoding method for decoding the data carrier shown in FIGS. 5a and 5b. In FIG. 6, the data carrier 12 of FIG. 5a is shown upside down with the photoluminescent layer 23 above the transparent data carrier 20 and the coating 21 being arranged at the bottom. However, the data carrier 12 could, of course, also be decoded in the orientation shown in FIG. 5a. If the data carrier 12, as schematically shown in FIG. 6, is illuminated with white light from the top, the different sections 23a, 23b and 23c of the photoluminescent layer 23 will, due to their different photoluminescent properties, emit red, green and blue light, respectively. Said colored light is transmitted through the transparent substrate 20 and absorbed by the coating 21 wherever no recess 22 is present. However, at each recess position the light emitted from the section of the photoluminescent layer 23 being arranged directly above said recess 22 will be visible on the bottom side of the data carrier 12. As discussed above with respect to FIG. 3b, the various recesses of different color will give a merged color impression to the human eye (similar to the effect of an RGB display) and create the color image encoded on the data carrier.

As outlined above, this process of encoding color information is technically ambitious as a proper registration between the various photoluminescent sections and corresponding pixel regions has to be ensured. Accordingly, it may be preferable to generate the colored light externally rather than in the data carrier itself. For this purpose, a data carrier 12 as shown in FIG. 4 may be utilized, which data carrier 12 merely comprises a transparent substrate 20 and a coating 21 with recesses 22. Again, these recesses 22 are arranged in pixels as shown in FIGS. 3a and 3a in order to encode color information. As explained above with regard to FIG. 6, the color information encoded in those pixels may again be extracted by illuminating the R, G and B sections of each pixel with red, green and blue light. In the decoding method schematically shown in FIG. 7, said colored light is generated by an RGB display 24 illuminating this data carrier 12 with a pattern of red, green and blue light sections 24a, 24b and 24c. In the example shown in FIG. 7, these sections 24a, 24b and 24c form continuous lines or stripes extending along the entire length of the display 24 in accordance with the pixel arrangement shown in FIG. 3b. If the data carrier 12 is now illuminated with the RGB display 24 by means of suitable optics 25, red, green and blue light will pass through respective recesses 22 in the coating 21. Accordingly, red, green and blue light will be emitted from the bottom of the data carrier 12 and the red, green and blue light from each pixel will again merge to a uniform color for each pixel, thus generating a color image to the human eye.

Figure 7:
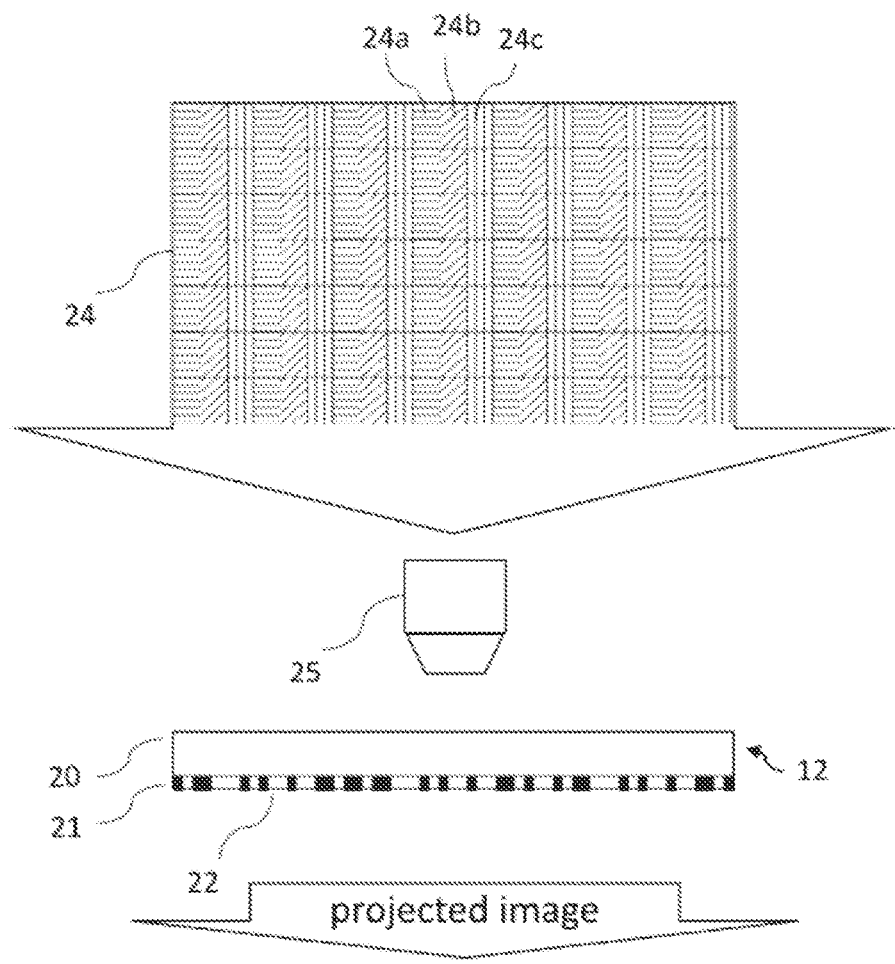
FIG. 7 schematically a second decoding method.
Figure 7:
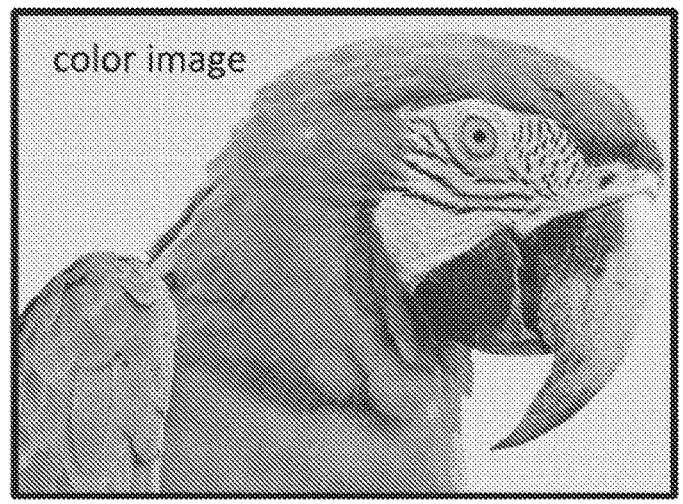

Of course, proper registration is again required which, however, in the case of FIG. 7 may be achieved in a much more simple way as the data carrier 12 can simply be translated and/or rotated with respect to the RGB display until a proper image is formed. For this purpose, the data carrier may contain one or more alignment sections which will only generate a predetermined color pattern once proper registration has been achieved.

Figure 8:
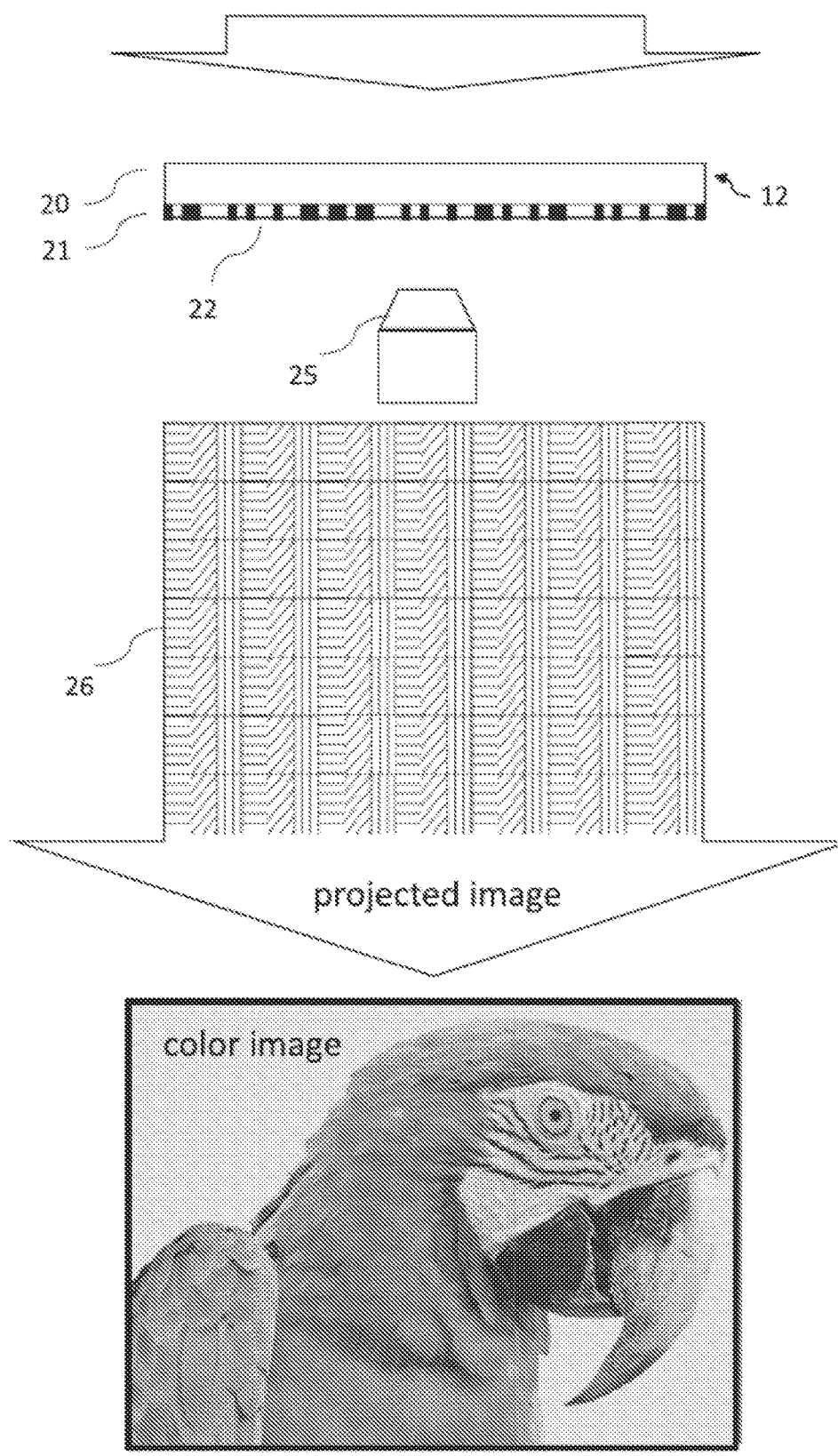
FIG. 8 schematically a third decoding method.

Finally, the color image encoded on the data carrier 12 may also be decoded without any colored light as schematically shown in FIG. 8. Again, the same data carrier 12 utilized in case of FIG. 7 may be used and illuminated with any illumination, e.g. with white light. The pattern of recesses 22 visible on the other side of the data carrier may be imaged by means of suitable optics 25 and a suitable image detector (such as a CCD camera) 26 in order to record the particular recess pattern of each pixel. Since a particular color value is allocated to each subset of recess positions of a given pixel (see FIG. 1b), the encoded color information can be extracted and, for example, displayed by means of a digital decoder and a corresponding display.

Figure 9:
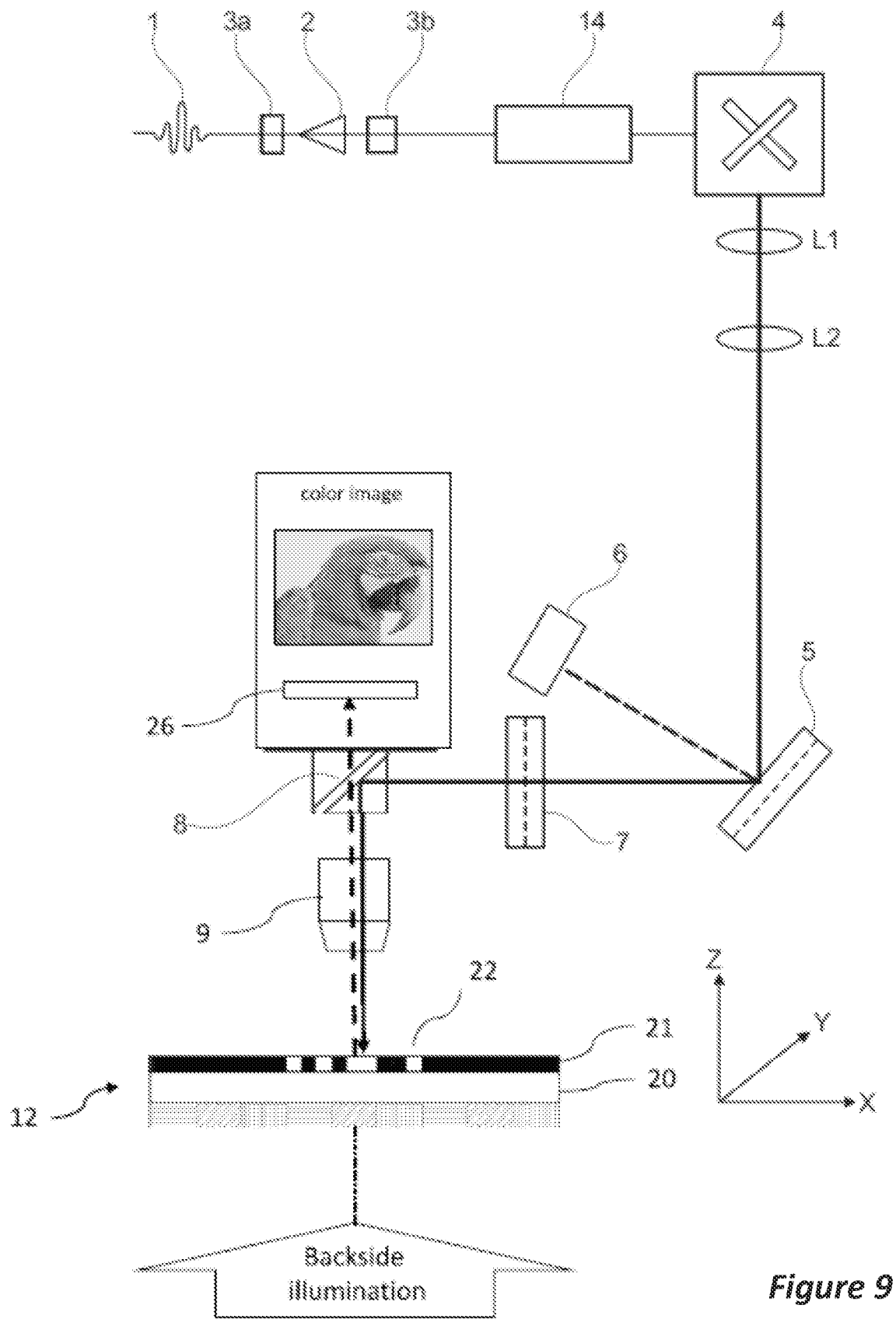
FIG. 9 a device for writing and reading out additional digital information from an image stored on a data carrier.

FIG. 9 shows a more elaborate device for reading out additional digital information from an image stored on a data carrier. Said device may also be used for high-speed recording data on the data carrier. FIG. 9 is almost identical to FIG. 1 of PCT Application Publication WO 2022/033701, the context of which is incorporated in its entirety by reference.

The device comprises a laser source 1, a motorized attenuator 3a, a beam expander 2, an attenuation rotator 3b, a flat top beam shaper (preferably including collimating optics) 14, a galvanometer scanner 4, a digital micromirror device (DMD) 5 adapted to emit multiple laser beams (of which only a single one is shown for simplicity), a beam dump 6, beam shaping optics 7, a semi-transparent mirror 8 and focusing optics 9 adapted for focusing each of the multiple laser beams emitted by the DMD 5 onto the coating 21 of a not yet encoded data carrier 12.

The galvanometer scanner 4 is configured to temporally distribute the laser power of the laser source 1 over the DMD 5. As explained in detail in PCT Application Publication WO 2022/033701, the galvanometer device 4 is configured to simultaneously illuminate only a section of the micromirror array of the DMD 5. Since the angle of the laser beam emitted from the galvanometer scanner 4 depends on the position or area on the DMD 5 which the galvanometer scanner 4 aims at, the device preferably comprises collimating optics L1, L2 in order to align the laser light emitted by the galvanometer scanner 4 to a predetermined entrance angle with respect to the DMD 5. In order to properly illuminate the galvanometer scanner 4 by means of the laser source 1 a motorized attenuator 3a, a beam expander 2, an attenuation rotator 3b, and a flat top beam shaper (preferably including collimating optics) 14 may be provided.

The DMD 5 comprises multiple micromirrors arranged in an array (not shown) and is adapted to emit multiple laser beams (not shown) along either a first direction (i.e., for recording) or along a second direction for each micromirror being in an "off" state diverting those laser beams into a beam dump 6. For each micromirror being in an "on" state, a laser beam is emitted via a beam splitter 8 through a focusing optics 9 which may, for example, comprise standard microscope optics having a high numerical aperture, onto the coating 21 being optionally mounted on an XY positioning system (which may optionally also be movable along the Z direction).

The device may further comprise beam shaping optics 7 such as a matrix of laser zone plates or a spatial light modulator, which may be configured to allow for optical proximity control, to generate Bessel beams, or to create a phase-shift mask.

In the embodiment shown in FIG. 9, the device further comprises a reading device 26 configured to image the recorded data and to, in particular, read out and/or display the additional digital information from an image stored on a data carrier 12. The reading device in this embodiment comprises a high-resolution digital camera for imaging the light transmitted through the recesses of the data carrier.

In the embodiment shown in FIG. 9, the data carrier 12 is illuminated from the backside with white light. The white light impinges on the RGB array of photoluminescent or fluorescent materials, thus creating an emission pattern of red, green and blue light. Said light passes through the transparent substrate 20 of the data carrier 12 and is blocked by the non-transparent coating 21 of the data carrier. However, wherever a recess 22 is present, the corresponding red, green or blue light passes through the coating 21 and via the focusing optics 9 onto the chip of, e.g., the CCD camera of the reading device 26. Thus, a high resolution color image may be collected by the CCD camera, which image may be displayed or used otherwise.

Figure 10:
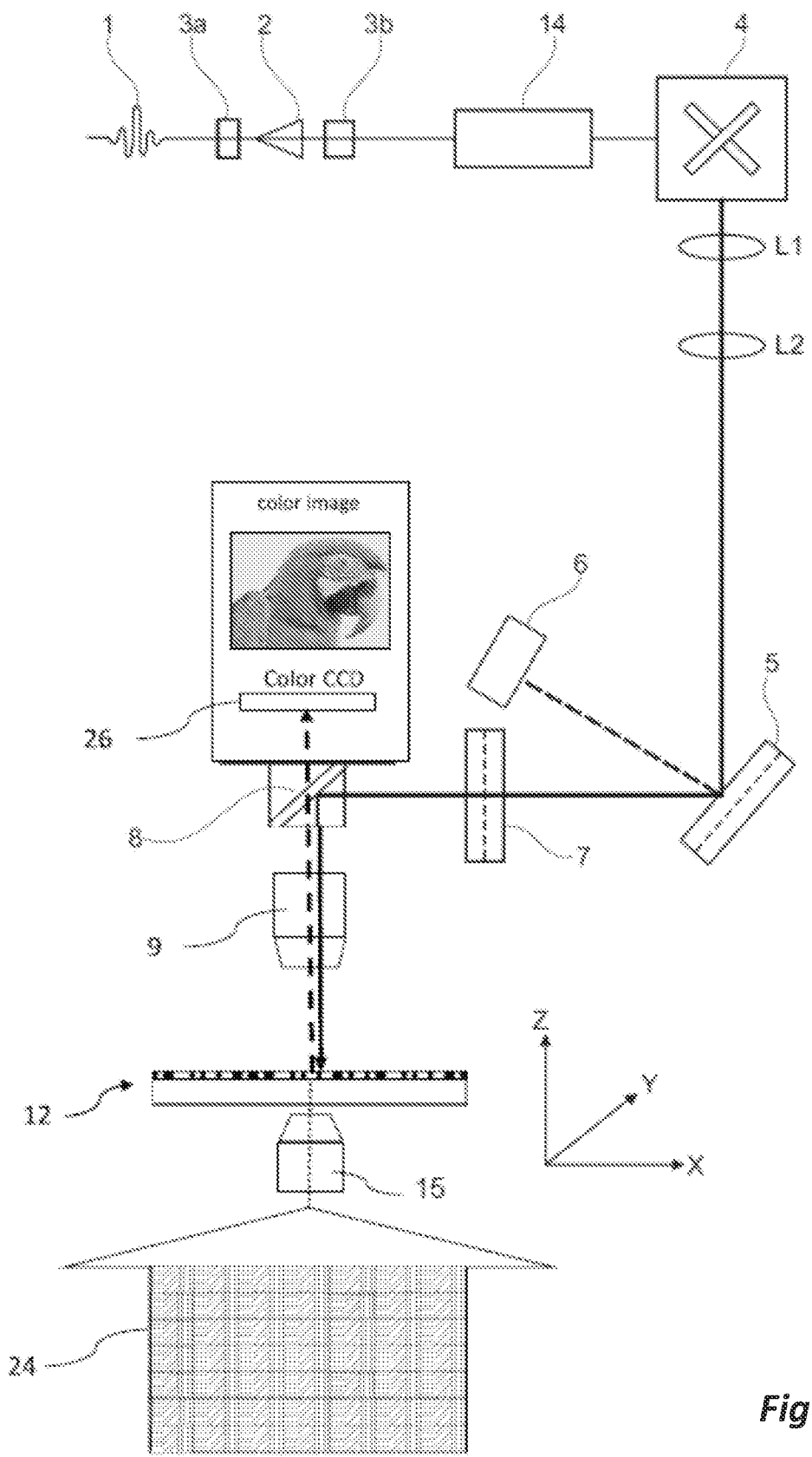
FIG. 10 a device for writing and reading out additional digital information from an image stored on a data carrier.

A similar device is shown in FIG. 10 with the white light source being replaced by an RGB display 24. This set-up allows for generating a color image without the need of a photoluminescent or fluorescent layer being present in the data carrier 12, as discussed above.

Finally, a digital coloring is schematically depicted in FIG. 11, which again utilizes homogenous illumination from the backside. In this embodiment, the subset of recesses is identified by each pixel and a predetermined color information is attributed to each pixel in accordance with the identified subset of positions at which a recess is present which attributed information is then used to "digitally" color the image, as schematically shown in FIG. 11.

Figure 11:
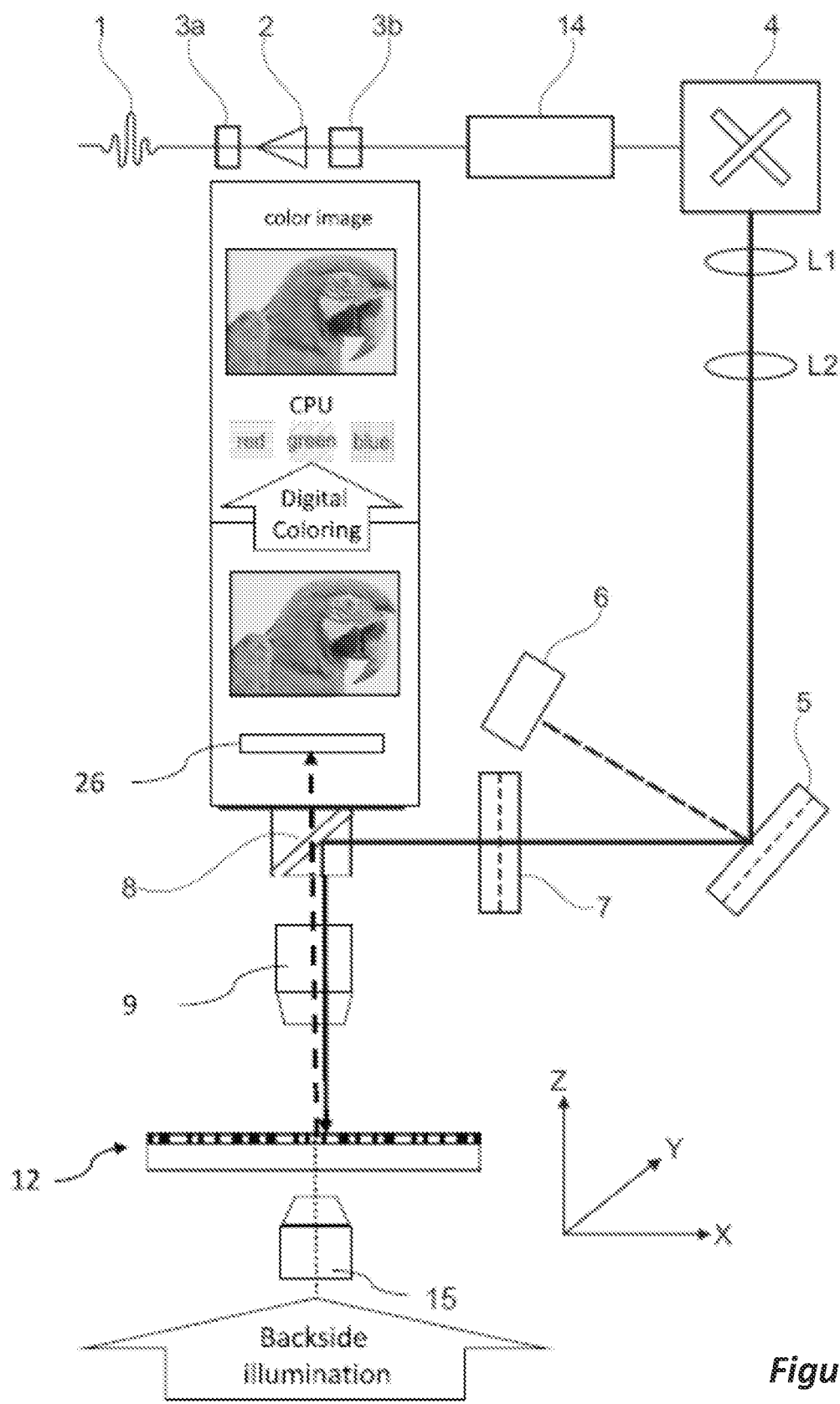
FIG. 11 a device for writing and reading out additional digital information from an image stored on a data carrier.
Figure 12:
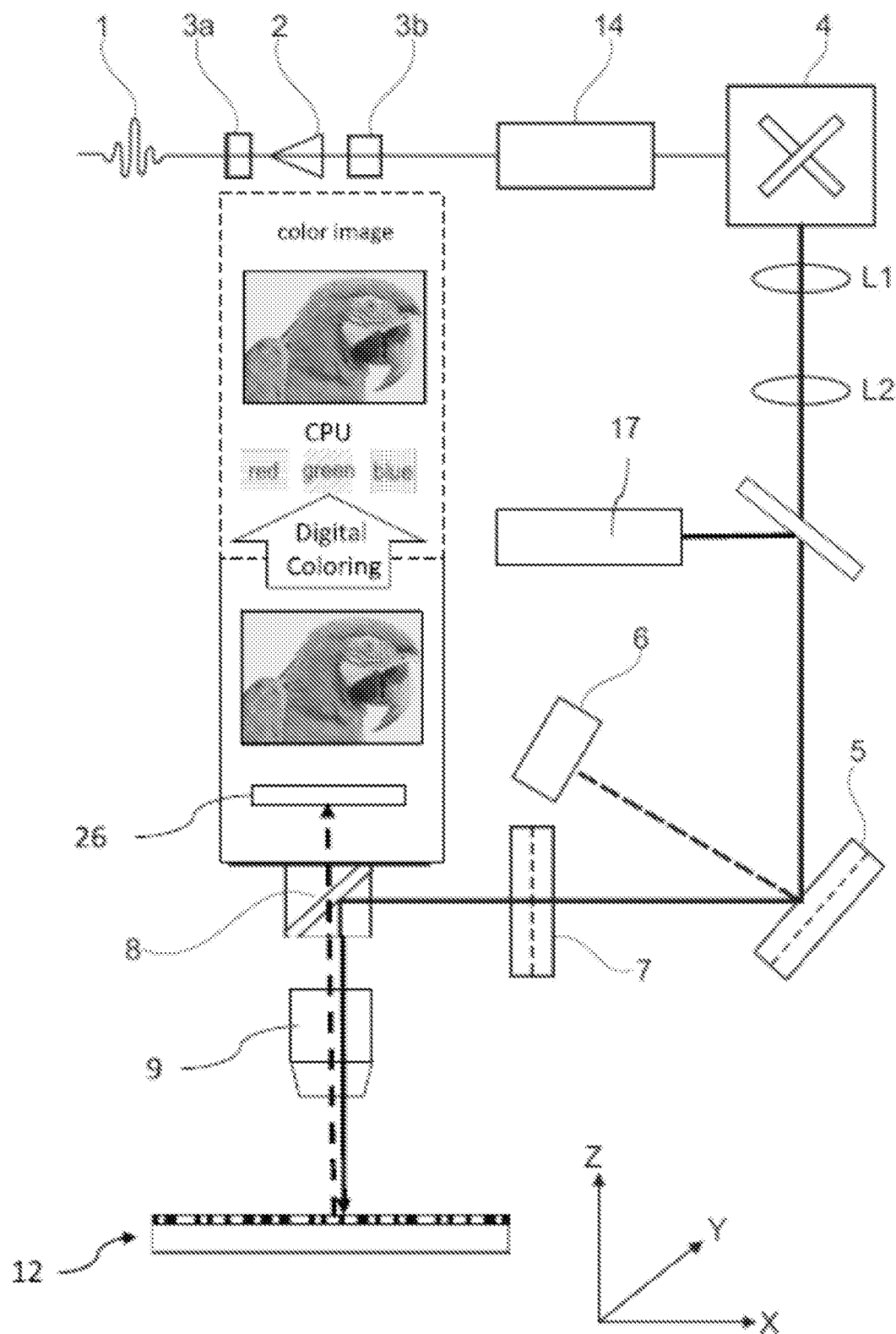
FIG. 12 a device for writing and reading out additional digital information from an image stored on a data carrier.

FIG. 12 shows a further device for writing and reading out additional digital information from an image stored on a data carrier which is analog to the device shown in FIG. 11. However, in case of FIG. 12 the reading mode is performed in reflection mode rather than in transmission mode. Illumination during read-out is performed by means of an additional light source 17.

The invention claimed is:

1. A method of concurrently storing grey scale information of an image and additional digital information, comprising:
   providing a data carrier; and
   creating a plurality of recesses in a surface of the data carrier by using a laser or a focused particle beam in order to encode information on the data carrier;
   wherein the plurality of recesses are grouped in pixels forming an image, each pixel comprising between zero and M recesses located at a subset of zero to M positions of N predetermined positions attributed to the pixel, wherein the number of recesses of a given pixel defines a visual grey scale value of the pixel and wherein the subset of positions of a given pixel defines additional digital information attributed to the pixel, wherein the additional digital information comprises either a more precise grey scale value of the pixel or one or a combination of an intensity of any of the colors red, green and blue of the pixel.

2. The method of claim 1, wherein each pixel has an area of at most 1 µm².

3. The method of claim 1, wherein the additional digital information further comprises one or a combination of: a letter, a number, a symbol, audio information, video information.

4. The method of claim 1, wherein providing the data carrier comprises providing a substrate and coating the substrate with a first coating of a material different from a material of the substrate; and wherein creating the plurality of recesses in the surface of the data carrier comprises creating the plurality of recesses in the first coating.

5. The method of claim 4, wherein the substrate comprises a glassy transparent ceramic material or a crystalline ceramic material.

6. The method of claim 4, wherein the substrate comprises one or a combination of: sapphire ($Al_2O_3$), silica ($SiO_2$), zirconium silicate ($Zr(SiO_4)$), $ZrO_2$, boron oxide, sodium oxide, potassium oxide, lithium oxide, zinc oxide, and magnesium oxide.

7. The method of claim 4, wherein the substrate has a thickness of at most 100 µm.

8. The method of claim 4, wherein the recesses extend through the coating towards the substrate.

9. The method of claim 4, wherein the substrate is a ceramic substrate.

10. The method of claim 1, wherein a visual grey scale of the image defined by the pixels is discernable by the naked eye or by means of refractive, diffractive or reflective optical elements without further processing in either reflection or transmission.

11. The method of claim 1, wherein single recesses of each pixel are not discernable by the naked eye.

12. The method of claim 1, further comprising creating multiple allocation elements which allow for allocating certain areas of the data carrier to the pixels.

13. The method of claim 12, wherein the allocation elements are created by a plurality of recesses different from the recesses of each pixel.

14. The method of claim 12, wherein the allocation elements comprise horizontal and/or vertical lines.

15. A method of reading out additional digital information from an image formed of pixels stored on a data carrier, wherein each pixel of the image comprises between zero and M recesses located at a subset of zero to M positions of N predetermined positions attributed to the pixel, the method comprising:

identifying, for each pixel, the subset of positions at which a recess is present; and attributing a predetermined information to each pixel in accordance with the identified subset of the positions at which a recess is present, wherein the predetermined information comprises one or a combination of: a grey scale value of the pixel, a color or color value of the pixel, an intensity of any of the colors red, green and blue of the pixel.

16. The method of claim 15, wherein the data carrier comprises multiple allocation elements which allow for allocating certain areas of the data carrier to the pixels, the method further comprising identifying the allocation elements and identifying the pixels based on the identified allocation elements.

17. A method of concurrently storing RGB color information of an image and additional digital information, the method comprising the steps of:

providing a data carrier; and creating a plurality of recesses in a surface of the data carrier by using a laser or a focused particle beam in order to encode information on the data carrier;

wherein the plurality of recesses are grouped in pixels forming an image, wherein NR+NG+NB predetermined positions are attributed to each pixel, the NR+NG+NB predetermined positions comprising NR predetermined R positions, NG predetermined G positions and NB predetermined B positions, wherein each pixel comprises between zero and MR recesses located at a subset of zero to MR positions of the NR predetermined R positions, wherein each pixel comprises between zero and MG recesses located at a subset of zero to MG positions of the NG predetermined G positions, wherein each pixel comprises between zero and MB recesses located at a subset of zero to MB positions of the NB predetermined B positions, wherein the number of recesses at the predetermined R positions, nR, of a given pixel defines an intensity of the color red, wherein the number of recesses at the predetermined G positions, nG, of a given pixel defines an intensity of the color green, wherein the number of recesses at the predetermined B positions, nB, of a given pixel defines an intensity of the color blue, and wherein the subset of zero to MR positions, the subset of zero to MG positions, and/or the subset of zero to MB positions of a given pixel defines additional digital information attributed to the pixel.

18. The method of claim 17, wherein NR, NG, and/or NB is at least 4.

19. The method of claim 17, wherein NR is equal to or greater than NG and/or NB.

20. The method of claim 17, wherein the additional digital information comprises one or a combination of: a more precise intensity of any of the colors red, green and blue attributed to the pixel, another color or color value attributed to the pixel, a letter, a number, a symbol, audio information, video information.

21. The method of claim 17, wherein providing the data carrier comprises providing a substrate and coating the substrate with a first coating of a material different from a material of the substrate; and wherein creating the plurality of recesses in the surface of the data carrier comprises creating the plurality of recesses in the first coating.

22. The method of claim 17, further comprising creating multiple allocation elements which allow for allocating certain areas of the data carrier to the pixels.

23. The method of claim 22, wherein the allocation elements are created by a plurality of recesses different from the recesses of each pixel.

* * * * *